May 8, 1934.   P. H. ESTES ET AL   1,958,361
METHOD OF LOCATING FAULTS IN CABLE CONDUCTORS
Filed Oct. 24, 1931

Inventor
Phillip H. Estes
Orris McGinnis

Eugene C. Brown
Attorney

Patented May 8, 1934

1,958,361

UNITED STATES PATENT OFFICE 1,958,361

METHOD OF LOCATING FAULTS IN CABLE CONDUCTORS

Phillip H. Estes, Rutherford, N. J., and Orris McGinnis, Brooklyn, N. Y., assignors to The Western Union Telegraph Company, New York, N. Y., a corporation of New York Application October 24, 1931, Serial No. 570,926

2 Claims. (Cl. 179—175.3)

This invention relates to methods of locating faults in the conductors of electrical cables, such as breaks or open circuits and crosses or short-circuits between adjacent conductors.

Irregularities or faults often occur in cable circuits employed in telephone, telegraph, electric lighting and other systems, due to opens, breaks and crosses between conductors. By testing the electrical characteristics of such circuits it is often possible to locate the cause and position of such irregularities. For example, as the capacity of a conductor is at certain current frequencies approximately proportional to its length, a means for measuring the capacity of such conductor will afford a means for determining the position in a line of an open or other fault. It has heretofore been proposed to balance the line capacities against known capacities which can be adjusted. In our method we balance the capacities between the parts of the faulty conductor and the other conductors against known resistances.

Figure 1:
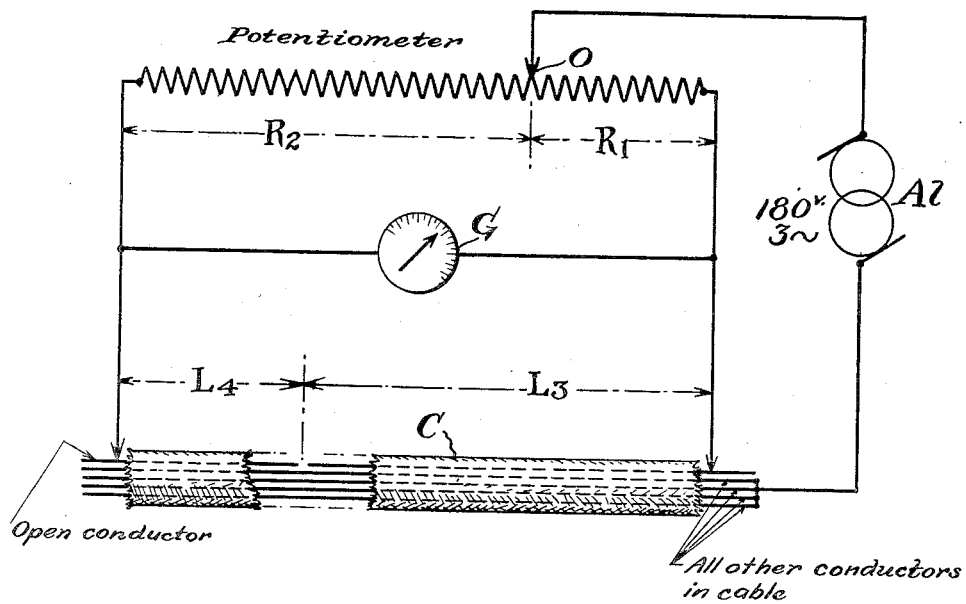
Figure 2:
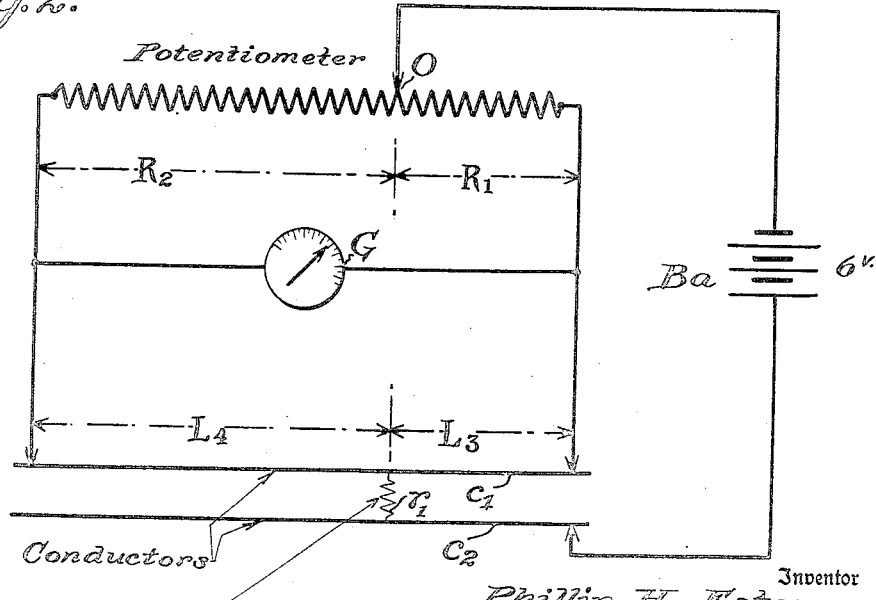

In the following detailed description we shall refer to the accompanying drawing illustrating schematic arrangements embodying the invention. In Fig. 1 is illustrated an arrangement for locating an open circuit in one of the conductors of a cable; and Fig. 2 shows an arrangement for locating a cross between two of the conductors.

In locating a break or open circuit in one of the conductors of a cable, in accordance with our invention, the resistance component and inductive component of the conductor impedance are neglected, since they are both very small while the relative capacities of the two ends of the open conductor are determined. Fig. 1 represents a cable having an open conductor, the unknown distance to the fault from each end being designated as $L_3$ and $L_4$. A potentiometer and a galvanometer are connected to opposite ends of the faulty conductor. The other conductors of the cable are connected together at one end to an alternating current source of potential $Al$ which may be 180 volts and three cycles per second. The alternating current generator $Al$ is also connected to a contact O movable over the potentiometer. This arrangement constitutes an A. C. bridge, two arms $R_1$ and $R_2$ being pure resistance and the other two arms $L_3$, $L_4$ being capacitance. When $R_1$ and $R_2$ are adjusted so that there is no deflection of the galvanometer G, the following relation holds:

$$\frac{Z_1}{Z_2}=\frac{Z_3}{Z_4}$$

where $Z_1$ and $Z_2$ represent the impedances of each side of the potentiometer, and $Z_3$ and $Z_4$ the impedances of each end of the cable. It follows that $$\frac{R_1}{R_2}=\frac{C_4}{C_3}$$

since $Z_1$ and $Z_2$ are pure resistances and $Z_3$ and $Z_4$ are pure capacities. Since the capacitance between two conductors varies directly with their length $$\frac{R_1}{R_2}=\frac{L_4}{L_3}$$

so that $$\frac{R_1}{R_1+R_2}=\frac{L_4}{L_3+L_4}$$

The potentiometer is so constructed that $R_1+R_2$ is always 10,000 ohms. Hence $$\frac{R_1}{10,000}=\frac{L_4}{L}$$

where L is the total length of the cable. Then $$L_4=L\frac{R_1}{10,000}$$

which gives the distance to the fault from the left hand end. $R_1$ is the reading of the potentiometer after the set has been balanced, and L is the total cable length which is already known.

The location of crosses between conductors of a cable are determined in a similar manner, except that in this case the potential is applied to the Wheatstone bridge arrangement from a direct current source so that the inductive and capacitative components are neglected and measurement is made by means of resistance. Fig. 2 shows two conductors $c_1$, $c_2$ of a cable crossed as indicated by the connecting resistance $r_1$. The potentiometer and galvanometer are connected to the ends of one conductor. One end of the other conductor is connected to one pole of a direct current source $Ba$, the other pole being connected to a contact O movable over the potentiometer. When this bridge set is balanced—

$$\frac{R_1}{R_2} = \frac{R_3}{R_4}$$

or $$\frac{R_1}{R_2} = \frac{L_3}{L_4}$$

since the resistance is directly proportional to the length. Hence $$\frac{R_1}{R_1 + R_2} = \frac{L_3}{L_3 + L_4}$$

and $$\frac{R_1}{10,000} = \frac{L_3}{L}$$

so that the distance to the fault from the right hand end is $$L_3 = L \frac{R_1}{10,000}$$

This equation holds regardless of the resistance of the fault.

Our method of testing is applicable mainly to cables which are coiled or wound upon a reel. Cables which have developed a fault in the field are wound upon a reel and are then transported to the point where they are tested and repaired. Prior methods of testing for faults use only one end of the cable and require an extra conductor for the return path. By connecting to both ends of the cable we eliminate the extra conductor which introduces a resistance component that must be balanced out in measuring for opens or breaks in the cable conductors.

We claim:

1. The method of locating a fault in a conductor of an electrical cable having a break or open circuit, which consists in arranging the parts of the conductor upon either side of the break as two sides of a Wheatstone bridge system and the portions of a potentiometer upon either side of the usual movable contact as the other two arms of the bridge, applying a source of alternating potential to the contact and to the remaining conductors of the cable in parallel, and adjusting the contact until a balance is obtained.

2. In an arrangement for locating a fault in a conductor of a multi-conductor cable having a break or open circuit in one of its conductors, the combination with the parts of the defective conductor upon opposite sides of the break, of a potentiometer provided with the usual contact adjustable thereover and having its ends connected respectively to the opposite ends of said conductor, and means for applying an alternating current potential to said contact and to the other conductors of the cable connected together at one end, thereby producing a capacity effect between the defective conductor and the other conductors, whereby upon the adjustment of said contact along the potentiometer until a balance is obtained, the resistance ratio of the two arms of the potentiometer will correspond with the ratio of the lengths of said parts of the defective conductor.

PHILLIP H. ESTES.
ORRIS McGINNIS.